(12) United States Patent
Meek (10) Patent No.: US 7,808,938 B2
(45) Date of Patent: Oct. 5, 2010

(54) VERY NARROW BAND MULTIPOINT COMMUNICATION SYSTEM

(76) Inventor: Thomas Meek, 2582 Briers North Dr., Atlanta, GA (US) 30360

(*) Notice: Subject to any disclaimer, the term of this patent is extended or adjusted under 35 U.S.C. 154(b) by 238 days.

(21) Appl. No.: 12/124,627

(22) Filed: May 21, 2008

(65) Prior Publication Data
US 2008/0291049 A1 Nov. 27, 2008

Related U.S. Application Data

(60) Provisional application No. 60/939,379, filed on May 22, 2007.

(51) Int. Cl.
*H04L 5/14* (2006.01)
*H04J 1/00* (2006.01)
*H04B 1/00* (2006.01)

(52) U.S. Cl. ......... 370/295; 370/480; 375/132

(58) Field of Classification Search .......... None
See application file for complete search history.

(56) References Cited

U.S. PATENT DOCUMENTS

| | | | |
|---|---|---|---|
| 6,859,831 B1* | 2/2005 | Gelvin et al. ............. | 709/224 |
| 7,145,474 B2* | 12/2006 | Shuey et al. ............. | 340/870.02 |
| 2002/0071478 A1* | 6/2002 | Cornwall et al. ............. | 375/132 |
| 2002/0181390 A1* | 12/2002 | Mody et al. ................. | 370/208 |
| 2006/0097892 A1* | 5/2006 | Zigdon et al. ............. | 340/870.02 |

* cited by examiner

*Primary Examiner*—Chirag G Shah
*Assistant Examiner*—Ashley L Shivers
(74) *Attorney, Agent, or Firm*—Michael J. Mehrman; Mehrman Law Office P.C.

(57) ABSTRACT

A very narrow band multipoint communication system suitable for use in an automatic meter reading (AMR) system having a communication protocol that divides each main channel of a frequency or digital code hopping system into multiple sub-channels and applies frequency division multiplexing among the sub-channels. Each sub-channel exhibits a very narrow band characteristic that allows gain increase to increase the transmission range of the meters. In addition, frequency division multiplexing among the sub-channels greatly increases the number of meters that can communicate on each main channel. The data collection device demodulates and decodes the multiplexed meter signals at an intermediate frequency with electronic circuitry. The resulting very narrow band AMR system exhibits greater transmission range, greater bandwidth and can accommodate a much larger number of meters per data collection device in comparison to a conventional narrow band AMR system.

17 Claims, 5 Drawing Sheets

VERY NARROW BAND MULTIPOINT COMMUNICATION SYSTEM

REFERENCE TO RELATED APPLICATION

This application claims priority to U.S. Provisional Patent Application Ser. No. 60/939,379 filed May 22, 2007 entitled "Multipoint Communication System," which is incorporated herein by reference.

TECHNICAL FIELD

The present invention relates generally to multipoint communication systems and, more particularly, to an automatic meter reading system implementing a very narrow band communication protocol that divides an operational frequency band into main channels, implements interference limiting frequency or digital code hopping among the main channels, divides the main channels into sub-channels, and implements frequency division multiplexing among the sub-channels.

BACKGROUND OF THE INVENTION

Compared to other types of RF communication systems, automatic meter reading ("AMR") systems are characterized by a relatively large number of meters that each transmit a relatively small amount of data infrequently at very low power. For example, a typical AMR system may include a number of data collection devices that each receive data from 10,000 to 100,000 meters reporting less than a kilobyte of data hourly at one mWatt. In the United States, the frequency band from 903 MHZ to 926 MHZ is available for this type of application but the governing regulations require very low broadcast power in the mWatt range. Other license exempt frequency bands around 2.4 GHZ and 5.8 GHZ are also available in the United States for some AMR applications, and a few different frequency bands are applicable in other countries. Within the license exempt frequency bands, the AMR communication protocol typically divides the operational frequency band into a number of channels and implements frequency or digital code hopping to reduce interference among the large number of transmitters using the frequency band. This enables the meters to transmit at one Watt rather than the one mWatt regulatory limit that applies to an unspread channel.

In general, AMR systems can be configured into coverage patterns based on the data handling capacities of the data collection devices and the transmission range and data transmission capacity of the meters. These components can be organized into simple point to multipoint configurations and more complex mesh networks. Ultimately, the cost and inefficiency of the AMR system can generally be reduced by increasing the data handling capacities of the data collection devices, the transmission range of the meters, and the data transmission capacities of the meters.

Conventional AMR systems are bandwidth limited, however, by the number of channels implemented by the communication protocol, the width of the channels, and the available gain in view of the broadcast power restrictions. Specifically, frequency or digital code hopping among the channels permits narrow band communication protocol within the spread spectrum, but does not offer any inherent performance advantage over single channel in terms of channel bandwidth. Conventional approaches to frequency or digital code hopping also limits the ability to further divide the operational frequency to achieve very narrow band performance. The frequency width of the narrow band communication channels limits the gain available within each channel. This can be a significant limitation at the low (e.g., mWatt) and medium (e.g., one Watt) power levels typical of AMR systems, often limiting the data transmission range to a kilometer or less. Frequency or digital code hopping to limit interference also prevents conventional AMR systems from implementing the types of multiplexing techniques used in mobile telephone and other RF applications to optimize the communication bandwidth. As a result, there is a continuing need for more efficient and effective communication protocols for AMR meter reading techniques, especially with regard to the issues of link budget and data rate, which have become increasingly pressing issues in recent years.

SUMMARY OF THE INVENTION

The present invention meets the needs described above in a very narrow band multipoint communication protocol suitable for use in an automatic meter reading ("AMR") system that implements a frequency division multiplexing technique in addition to the interference limiting frequency or digital code hopping technique typically implemented by AMR systems. More specifically, the inventive very narrow band communication protocol divides each main channel of an interference limiting frequency or digital code hopping system into multiple sub-channels and applies frequency division multiplexing among the sub-channels. This allows each sub-channel to exhibit a very narrow band characteristic that allows the gain to be increased within the very narrow band, which in turn increases the transmission range of the transponders, such as a large number of geographically distributed meters. Because the multiple channels reduce transmission collisions and hence restore the capacity lost by the increased transmission range, frequency division multiplexing among the sub-channels greatly increases the number of transponders that can communicate with the data collection device on each main channel. The data collection device demodulates and decodes the multiplexed data signals at an intermediate frequency that allows digital signal processing ("DSP") techniques, such as demodulation and orthogonal code FFT decoding, to be implemented with electronic circuitry. The resulting very narrow band multipoint communication system exhibits greater transmission range, greater bandwidth through its ability to frequency division multiplex many subchannels within a main channel, and can accommodate a much larger number of transponders per data collection device in comparison to a conventional narrow band AMR system.

Generally described, the invention may be implemented as a very narrow band communication system suitable for use in a point to multipoint application, such as an AMR system. The system includes a plurality of geographically distributed transmitters or bi-directional transponders configured for transmitting communication signals via a communication protocol. The system also includes at least one data collection device configured to receive the communication signals from the transmitters pursuant to the communication protocol. The communication protocol divides an operational frequency band into a plurality of main channels and applies an interference limiting hopping technique among the main channels. In addition, each main channel is divided into a plurality of very narrow band sub-channels with frequency division multiplexing among the sub-channels.

Referring more specifically to an AMR example, the invention may be implemented by a communication system that includes a number of geographically distributed meters that each include a transmitter that is operational for transmitting communication signals with meter data via a communication protocol. The AMR system also includes at least one data collection device configured to receive the communication signals from the meters. The communication protocol includes an operational frequency band divided into a plurality of main channels and application of an interference limiting hopping technique among the main channels. The interference limiting hopping technique may include frequency hopping or digital code hopping. In addition, each main channel is divided into a plurality of very narrow band sub-channels with frequency division multiplexing among the sub-channels.

The data collection device down-converts the communication signals from the operational band frequency to an intermediate frequency band, samples the intermediate frequency band to obtain digital representations of the communication signals, and digitally processes the digital representations of the communication signals to demodulate the communication signals and decode the frequency division multiplexing among the sub-channels with electronic circuitry. The processing of the digital representations of the communication signals typically includes application of an orthogonal code FFT (Fast Fourier Transform) algorithm.

Each meter may be configured with a transponder to engage in bi-directional communications with the data collection device. In a bi-directional embodiment, communications from the data collection device to the meters implement channel synchronization for the interference limiting hopping technique of the communication protocol, and communications from the meters to the data collection device deliver the meter data to the data collection device pursuant to the communication protocol. In addition, each meter may communicate its associated meter data directly to the data collection device in a point-to-multi-point configuration, or the meters may be configured in a mesh configuration in which one or more mesh meters communicate their associated meter data to a hop meter, which communicates its associated data and the data received from the mesh meters to the data collection device. In the mesh configuration, each hop meter may be configured to communicate with one or more mesh meters via narrow band channels that are substantially wider than the very narrow band sub-channels used for communications between the hop meter and the data collection device. In addition, frequency division multiplexing is typically applied in the communication links from the hop meters to the data collection device but is generally not needed in the communication links between the mesh meters and the hop meters.

These features and the resulting advantages of the very narrow band AMR system will become apparent to the skilled artisan upon examination of the following drawings and detailed description. It is intended that all such additional features and advantages be included within the scope of the present invention.

DETAILED DESCRIPTION OF THE EXEMPLARY EMBODIMENTS

The present invention may be embodied in a very narrow band point to multipoint communication system that uses single or multi-channel transponders where the multipoint receiver, also referred to as a data collection device, is more advanced in its technology than the single point transmitters and receivers. The very narrow band communication system is particularly well adapted for use in an application characterized by a relatively large number of transponders that each transmit a small amount of data infrequently at low power. The illustrative very narrow band point-to-multipoint communication system described below is specifically designed for an automatic meter reading ("AMR") system, but may be used in other applications having similar characteristics. The principle advantages of the very narrow band communication system are greater transmission range, greater packet bandwidth, and the ability to accommodate a much larger number of transponders per data collection device in comparison to conventional narrow band communication systems. These advantages result from the communication protocol implemented by the system, in which the narrow band channels typically used in a point to multipoint communication system are further divided into very narrow band sub-channels, which are multiplexed to accommodate multiple transponders per narrow band channel. For an AMR systems with relatively low data rates, the very narrow band communication protocol typically implements as many as 40 or 50 sub-channels per main channel.

In the illustrative AMR system described below, the communication protocol divides a 25 MHz operational frequency band from 903 MHz to 928 MHz into 50 main channel nominally 500 kHz wide, which typically are somewhat wider and overlap each other to some extent. The system applies frequency or digital code hopping to the main channels to limit interference, and further divides each 500 kHz main channel into very narrow sub-channels, such as 50 sub-channels 10 kHz wide or 40 sub-channels 12.5 kHz wide, and applies frequency division multiplexing among the sub-channels. This allows each sub-channel to exhibit a very narrow band characteristic (i.e., 10 or 12.5 kHz) that allows the gain to be significantly increased within the very narrow band, which increases the transmission range of the meters. In addition, frequency division multiplexing among the sub-channels greatly increases the number of meters that can communicate on each main channel (e.g., theoretically up to 40 or 50 meters per main channel). The data collection device demodulates and decodes the multiplexed meter signals at an intermediate frequency that allows the digital signal processing to be implemented with electronic circuitry.

Figure 1:
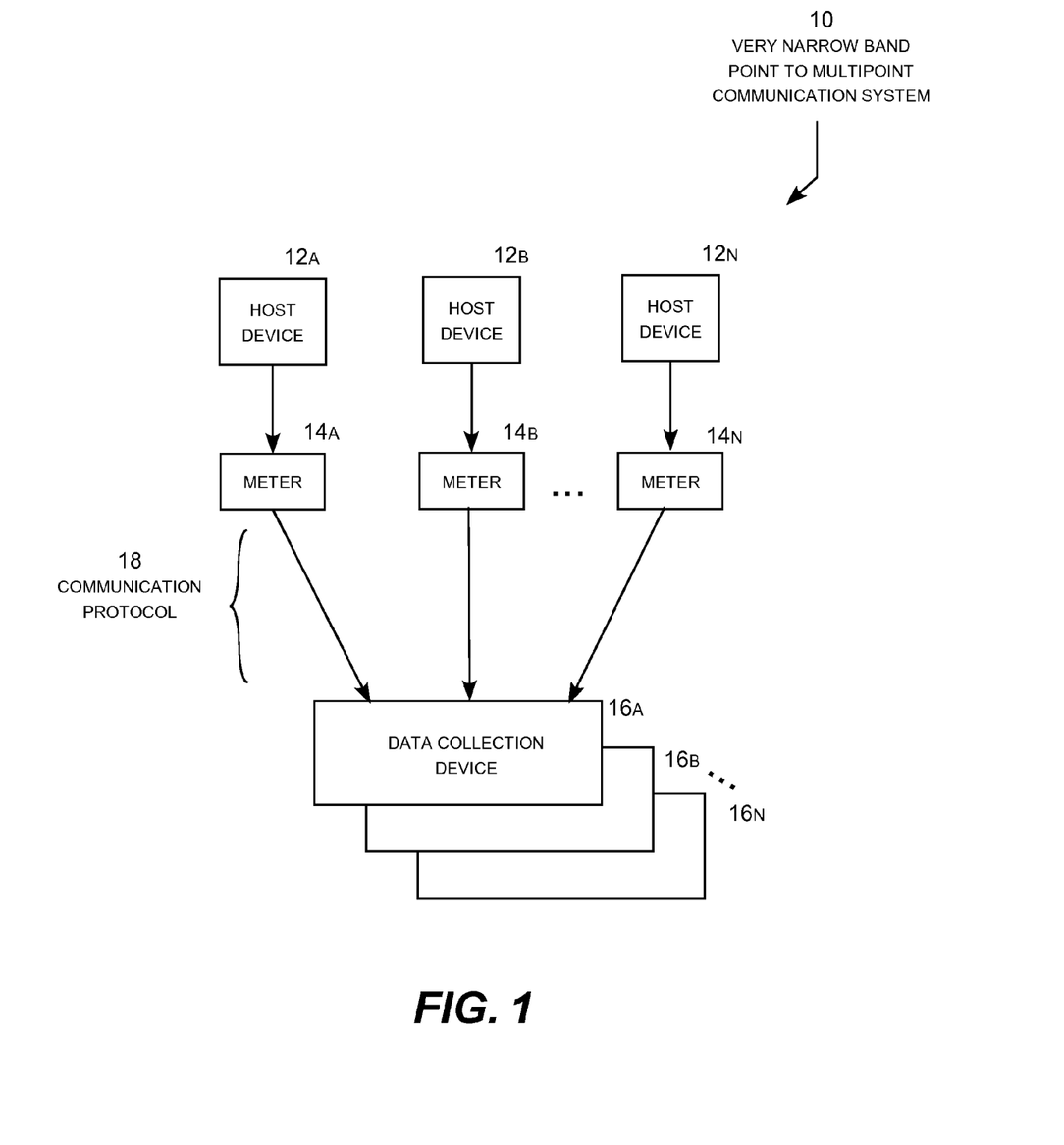
FIG. 1 is a functional block diagram of a very narrow band AMR system having a point-to-multi-point configuration.

Turning now to the figures, in which like numerals refer to similar elements throughout the figures, FIG. 1 is a functional block diagram of an illustrative very narrow band multipoint communication system, in this example an AMR system 10. The AMR system includes a number of host devices 12A-N that have some variable parameter metered by respective meters 14A-N. The meters 14A-N report their associated meter data to the data collection device 16A via a communication protocol 18, which implements the very narrow band features of the communication system. The basic data collection device to multiple meter configuration may be repeated over multiple data collection devices 16A-N, as desired, to cover a larger, geographically distributed AMR system. Although electric, gas and water meters are the most common examples of AMR systems, similar systems could also be used to meter a wide range of parameters, such as data delivery in an information network, traffic flow using RFID or other tracking devices in a road transportation system, electric system transmission and distribution parameters throughout an electric grid, irrigation flows through a plumbing system, financial transactions, and various other industrial, commercial and transportation processes.

The data collection devices 16A-N, typically relying on pole- or building-mounted antennas, communicate the meter data to a central processing station over a bulk transmission facility, such as a microwave link, GPRS, optical fiber or other suitable or backhaul link. The components of the AMR system, other than the communication protocol 18 and associated communication equipment, are conventional and need not be described further here. It should be appreciated, however, that the communication protocol of the present invention may be included in virtually any type of point-to-multipoint system to obtain the advantages of the very narrow band communication system achieved by the present invention.

A typical AMR system includes a number of data collection devices that each receive data from 10,000 to 100,000 meters reporting less than a kilobyte of data hourly at one mWatt. Each meter 14A-N transmits on one of a number of very narrow band, frequency multiplexed sub-channels, which each occupy a few kHz to 50 kHz (10 kHz and 12.5 kHz are typical examples) over a significantly larger main channel, such as 500 KHz. Each meter may transmit in a random time slot such that it is picked up by the data collection device 16A on any one of the sub-channels. The sub-channels leverage a sensitivity gain by being very narrow band (e.g., 10 or 12.5 kHz) in relation to the narrow band main channel (e.g., 500 kHz). The meters 14A-N may exhibit frequency error due to the economics of the frequency control and can also be further randomized over the range of bands occupied by data collection device 16A. Considerable randomness in frequency as well as time is a significant advantage of the communication protocol 18.

Figure 7:
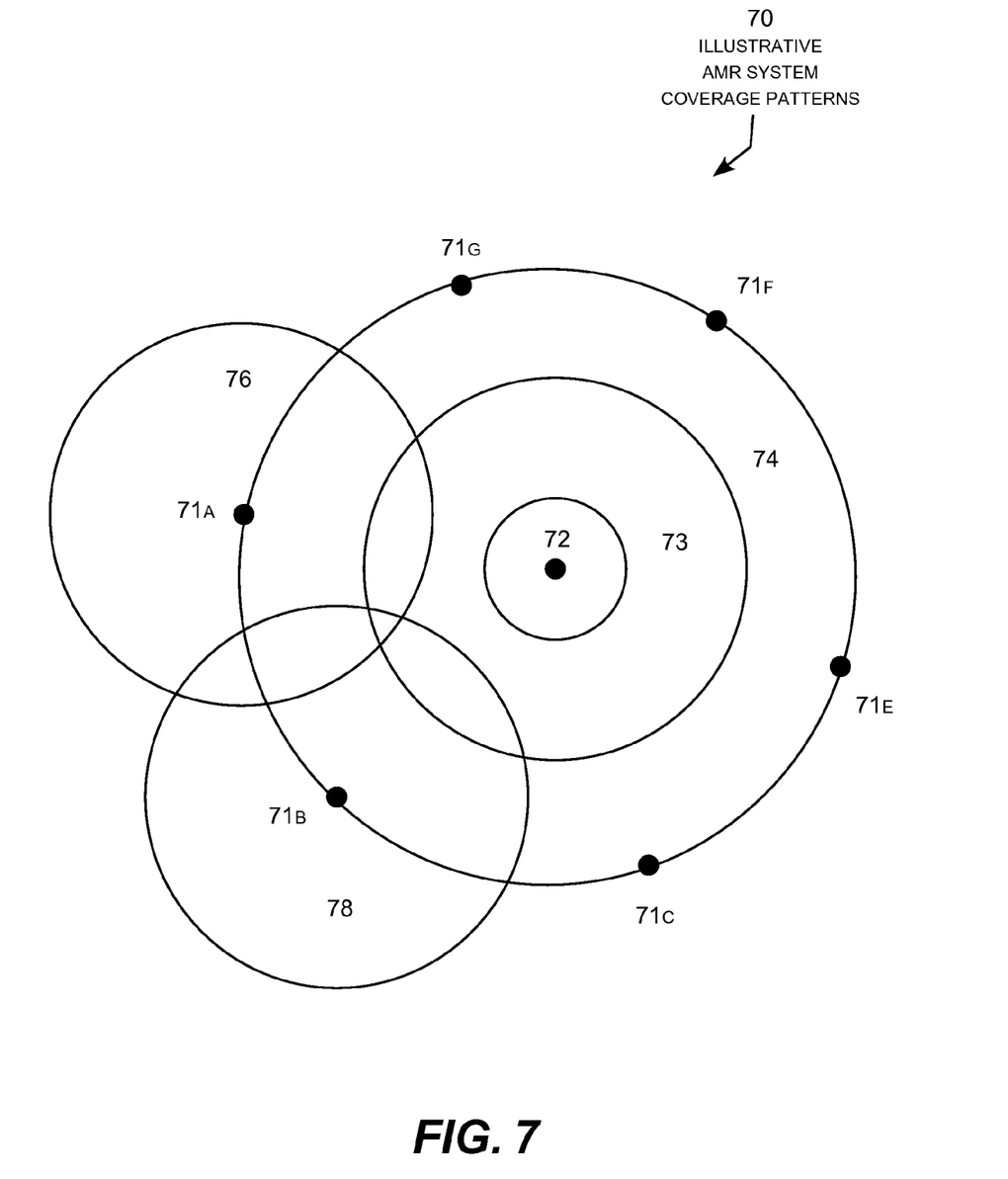
FIG. 7 is a conceptual illustration of AMR system coverage patterns.

The data collection device 16A of the point-to-multipoint system 10, which is typically located on a building or tower, communicates directly with its associated meters 14A-N. As shown in FIG. 7, the multi-channel data collection device 16A can be replicated geographically to cover a given area similar to a cellular phone system. The meters 14A-N typically include bi-directional transponders, where the sensitivity advantage of the data collection device is also carried over to the meters. This requires the bandwidth of the meters to be very narrow band, similar to their associated data collection devices. In a unidirectional or simplex embodiment, the meters follow a predefined hopping pattern and the data collection point detects the frequency or code used by each meter and follows the lead set by each meter. In a bi-directional or duplex embodiment, the data collection device keeps track of the transmission frequency used by each particular meter, communicates with the meters on the same sub-channels used by the meters, and instructs each meter to change frequency or code among the main channels in accordance with the frequency or code hopping technique. This allows the meters to follow the lead set by the data collection device. In this manner, a sensitivity enhancement is achieved for the half mode or full duplex system in both radio communication directions between the meters and the data collection devices. Since some control of the meter is required for this sensitivity enhancement, the very narrowband system is typically for full two way or at least 1.5 way systems and not simplex or one way systems. At minimum, a timing signal is required for the meters to be synchronized in specific time slots with the data collector.

Figure 2:
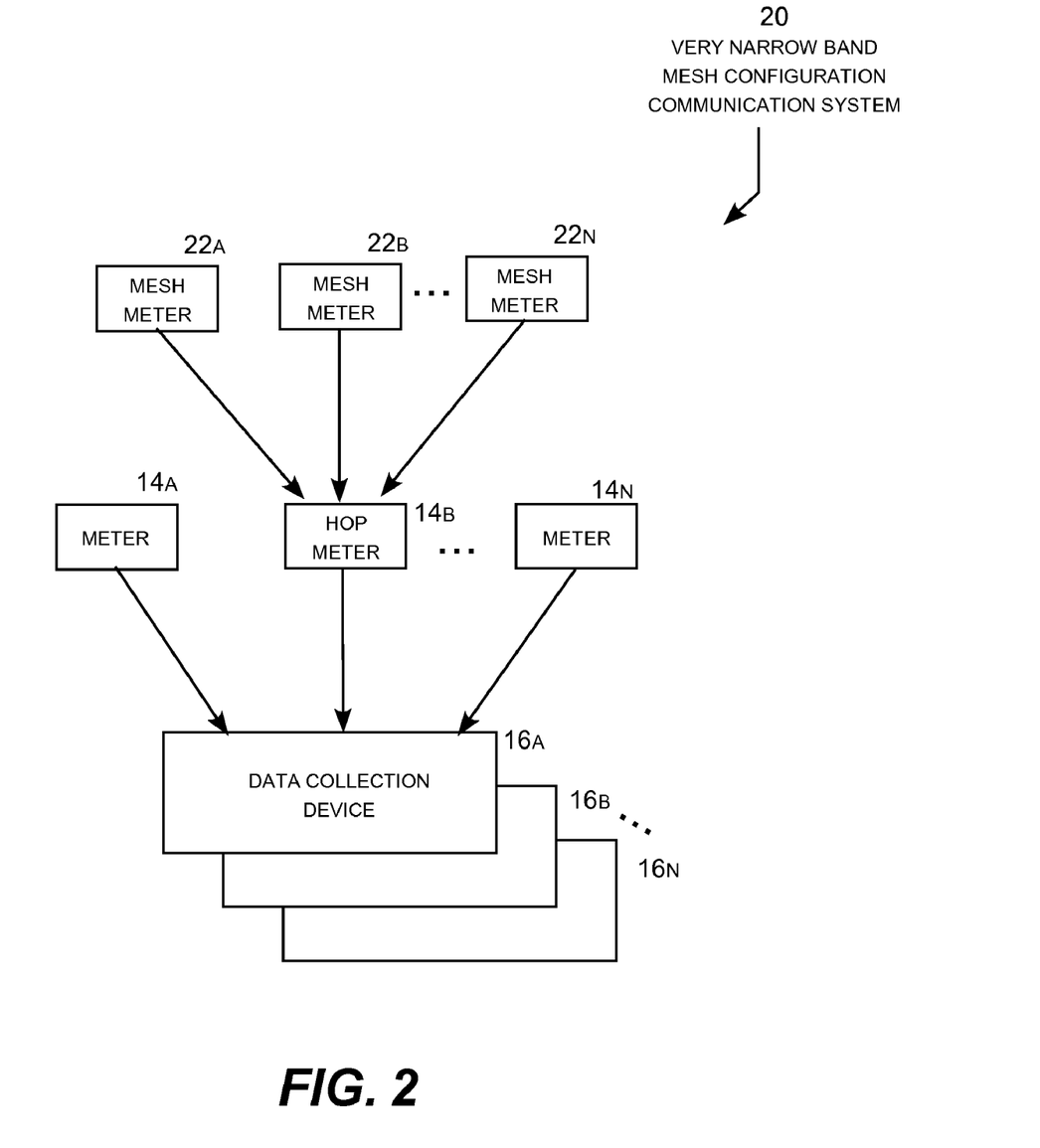
FIG. 2 is a functional block diagram of a very narrow band AMR system having a mesh configuration.

FIG. 2 is a functional block diagram of a very narrow band AMR system 20 having a mesh configuration. In this alternative, a number of mesh meters 22A-N communicate their associated data to a hop meter 14B, which transmits its associated data as well as the data received from the mesh meters to the data collection device 16A. That is, the hop meters are configured to receive information or packet data from one or more other meters, known as mesh meters, and relay that data upstream to data collection devices or other hop meters in a mesh network configuration. FIG. 2 shows one level of the mesh design for an illustrative meter 14B. It should be appreciated that this technique may be repeated for multiple meters and multiple levels of hops. In addition, some of the meters communicating with the data collection device may be hop meters communicating data for multiple meters, while others may be single point meters. The mesh, hop and single point meters may include identical hardware with the different functionality configured in software, so that any meter may be configured to operate as a mesh, hop, or single point meter, as desired. The meters may also be reconfigured, locally or remotely, on an ongoing basis to adjust the configuration in response to changing radio fade or data load conditions. Typically, each mesh meter does not communicate directly with the data collector, but may communicate with other mesh meters or a designated hop meter. The communication link between meters will typically be a standard narrowband, single channel in nature, whereas the communication protocol between the hop meters and the data collection device implements the very narrowband technology with sub-channel definition and multiplexing among the sub-channels.

Figure 3:
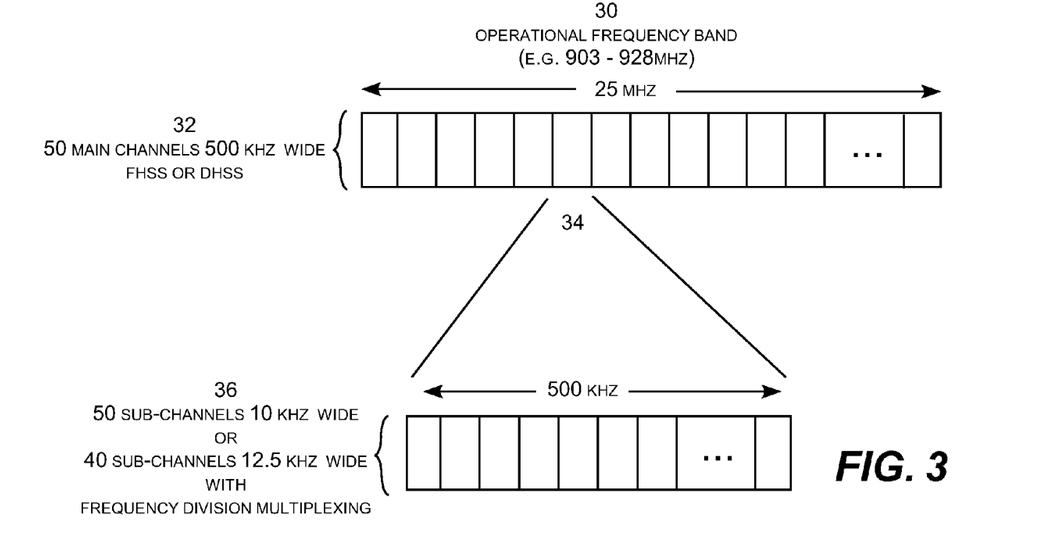
FIG. 3 is a conceptual illustration of the communication protocol for the very narrow band AMR system.

FIG. 3 is a conceptual illustration of the communication protocol 18 for the very narrow band AMR system. This particular example includes an operational frequency 30 from 903 to 928 mHz. The 25 MHz operational frequency is divided into a number of main channels 32. In this particular example 50 main channels, each 500 kHz wide are used. The communication protocol applies frequency hop spread spectrum (FHSS) or digital hop spread spectrum (DHSS) among the main channels to limit interference. Referring to an illustrative main channel 34 shown in FIG. 3, the 500 kHz main channel is further divided into a number of very narrow band sub-channels, such as 50 sub-channels 10 kHz wide or 40 sub-channels 12.5 kHz wide. The communication protocol applies frequency division multiplexing among the sub-channels, which allows a relatively large number of meters to use each main channel (i.e., theoretically, up to 50 meters can be accommodated by the 50 sub-channels 10 kHz wide and 40 meters can be accommodated by the 40 sub-channels 12.5 kHz wide).

It should be appreciated that the 50 main channels 500 kHz wide occupy about 25 MHz of spectrum in the 903 to 928 MHz license exempt band. This is an example of frequency hopping spread spectrum, where the main channel hops in synchronism between a data collector and the meters it serves on a set cyclic pattern. This reduces interference to other systems and users of the band and makes possible an uplift of allowed ERP (broadcast power) from 1 mWatt to 1 Watt for the band in compliance with FCC part 15 regulations. An alternative technique is to spread the 500 kHz main channel digitally by code division over the 25 MHz band. In either case, the hop pattern repeats cyclically. For a system with unidirectional meters, the data collection device first detects the frequency or code used by each meter and then follows each meter as it cycles through the hop pattern. For a system with bidirectional meters, the data collection device determines the frequency or code to be used by each meter and instructs and synchronizes each meter, which then follows the lead set by the data collection device.

Figure 4:
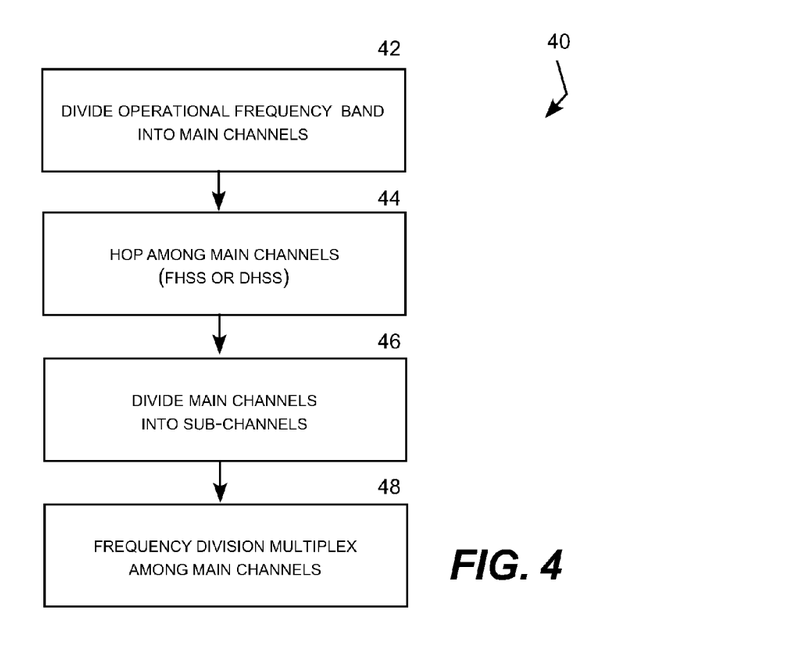
FIG. 4 is a logic flow diagram illustrating communication protocol of the very narrow band AMR system.

FIG. 4 is a logic flow diagram 40 illustrating communication protocol of the very narrow band AMR system. In step 42, the system divides the operational frequency band into a number of main channels. In this example, a 25 MHz operational frequency from 903 to 925 MHz is divided into 50 main channels 500 kHz wide. In step 44, the system applies FHSS or DHSS frequency hopping among the main channels to limit interference. In step 46, the system further divides each main channel into a number of sub channels. For example, each 500 kHz main channel may be divided into 50 sub-channels 10 kHz wide. In step 48, the system applies frequency division multiplexing among the sub channels to allow multiple meters to use each main channel.

FIG. 4 illustrates the concept of sub-channel multiplexing within a FHSS or DHSS full duplex AMR system operating in the 903 to 928 MHz band. The operational frequency band is split into 50 or more main channels, nominally 500 kHz wide or less. The main channels hop across most or all of the available spectrum of 25 MHz according to a system defined cyclic pattern for FHSS or are spread by high bit rate or "chip rate" in an a DHSS system. The code associated for the chip rate should be used system wide and fixed so that the data collection device and its associated meters all operate at the same chip rate. Each main channel is itself divided into sub-channels, such as 40 12.5 KHz channels or 10 50 KHz channels. The actual width and number of channels is a matter of design selection. The sub-channels form an FDM link in which the meter population serviced by a specific collector will be divided somewhat evenly among the sub-channels, either through natural frequency errors or a deliberate "dither" applied to meter transmission across the main channel band. This technique further enhances the capacity and range over a simple narrowband link by ensuring equal randomization and loading on each subchannel.

Figure 5:
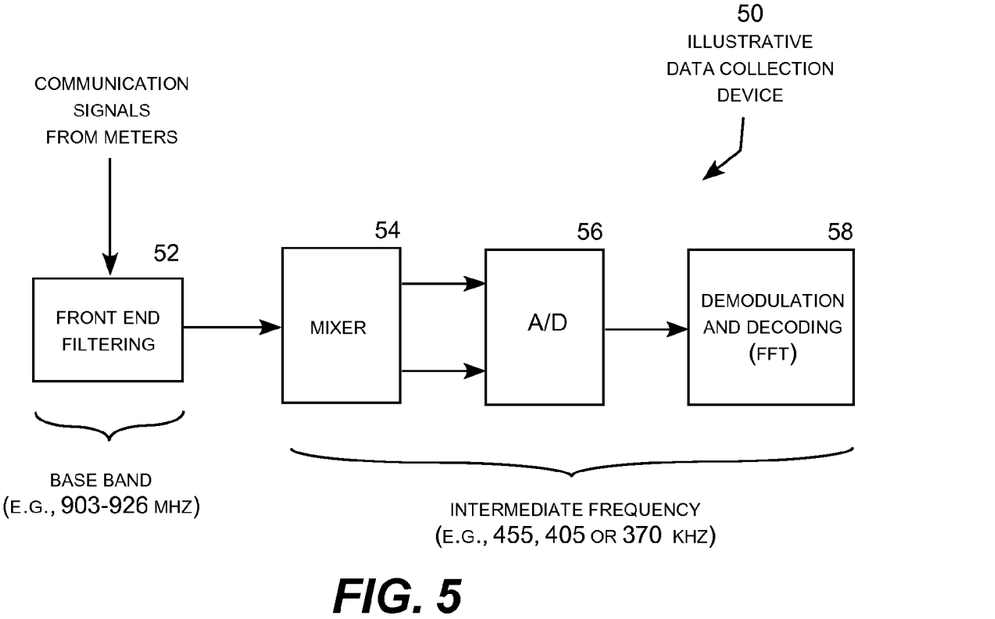
FIG. 5 is a functional block diagram of an electronic demodulator and decoder for a data collection device in the very narrow band AMR system.

FIG. 5 is a functional block diagram of an electronic demodulator and decoder for an illustrative data collection device 50 in the very narrow band AMR system. The data collection device includes front end filtering 52, which is applied to the data signals received from the meters. The front end filtering typically includes band pass and noise suppression analog filters operating at the base band frequency of 903-928 MHz. The filtered data signals are delivered to a mixer 54, which down-converts the communication signals to an intermediate frequency ("IF") suitable for electronic circuitry, such 455, 405 or 307 KHz. The mixer 54, which is shown in greater detail in FIG. 6, also splits the data signals into orthogonal components referred to as the in-phase ("I") and quadrature ("Q") components. The I and Q components are then delivered to an analog-to-digital converter ("A/D") 56, which samples the I and Q components to obtain a digital representation of the data signals. The digital representation of the data signals is then delivered to a decoder and demodulator 58, which constructs a digital sub-channel representation of the data signals. The decoder and demodulator 58 typically implements a fast Fourier transform ("FFT") algorithm that, in effect, generates a bank of digital filter passbands that generate the sub-channels comprising the main channel. Various enhancements to the basic FFT algorithm are possible. For instance if the time domain window is too short, a dual FFT algorithm could be implemented to overlap the windows to ensure continuous processing of the incoming packets without gaps. Since A to D. is applied at the IF frequency, the sub-channels are filtered digitally with electronic circuitry, which allows the data collection device to process several incoming data packets at once. Demodulation and detection may also be applied by the DSP.

The data collection device may also control the power transmission level of the meters to a minimum level required to sustain proper data decoding a further refinement to ease the selectivity requirement and reduce the amount of interference incurred within the AMR system. That is, the data collection device may reduce the power level of a particular meter until decoding of the meter's data degrades, and then increase the power level by a predefined margin to ensure that the transmit power level of the meter is adequate for good data decoding but not excessive. The data collection device can apply the same power control algorithm to each meter periodically to properly adjust the power level of the meters in response to changing network conditions.

Figure 6:
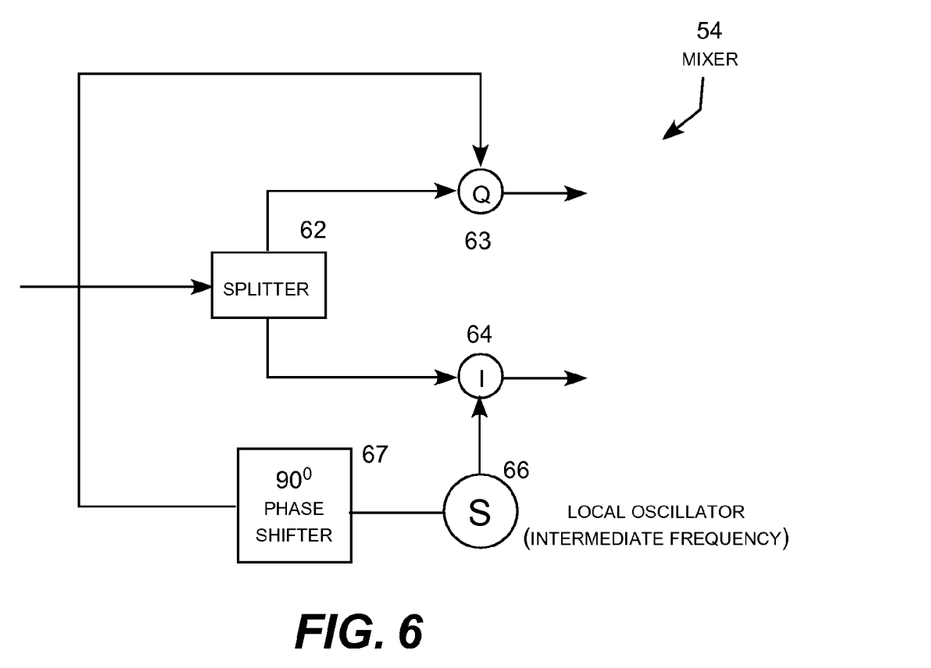
FIG. 6 is a functional block diagram of a mixer in the electronic demodulator and decoder of FIG. 5.

FIG. 6 is a functional block diagram of the mixer 54 described above with reference to FIG. 5. The filtered data signals are delivered to a splitter 62, which delivers split data signals to a quadrature component mixer 63 and an in-phase component mixer 64. A local oscillator 66 delivers an IF signal to the in-phase component mixer 64 and to a 90° phase shifter 67, which delivers a phase-shifted IF signal to the quadrature component mixer 63. The in-phase component mixer 64 down-converts the data signal to an in-phase IF signal "I"; whereas the quadrature component mixer 63 down-converts the data signal to an orthogonal quadrature IF signal "Q." It will be appreciated that after A/D conversion, the digital representation of the data signals as orthogonal components "I" and "Q" are suitable for FFT digital signal processing. In this manner, the very narrow sub-channels can be implemented through use of DSP chips on the data collection devices. The very narrow channels are adjacent to each other and can, depending on the specific implementation, be slightly overlapped or significantly overlapped. A heavy overlap will guarantee that a meter is received whatever frequency it transmits on in the band but involves more channels to cover a specific bandwidth like 500 KHz. Less overlap needs some frequency control on the meter to ensure it transmits in the center of a specific sub-channel.

FIG. 7 is a conceptual illustration of AMR system coverage patterns 70. A specific AMR system coverage pattern can be designed to achieve desired coverage and capacity once the parameters of the individual components has been determined. To illustrate one simplified example, the tower based collector 72 will communicate via the advanced multi-channel DSP based links to hop meters as described previously. In range terms, this link will have marked performance improvements over conventional AMR configurations, which, in addition to the height gain of being on a building top, will give a good link performance out to several kilometers to certain meters on the maximum range annulus that are selected in software to be "hop" rather than "mesh" meters 71A-F. A useful enhancement effect that enables reliable range or 3 Kilometers or substantially more is predicted from fade statistics. The signal received on the annulus of the nominal tower collector range circle is heavily influenced by fade statistics. The ability of the system to dynamically select optimal hop meters will virtually nullify the effect of fades and may even result in a few dBs of signal enhancement. This dynamic selection will result in 30 dB or more of signal enhancement as predicted by fade statistics. The circular area 73 around the data collection device 72 indicates a range of approximately 0.5 kilometers, which is a typical range experienced by a pole-mounted rather than a tower-mounted data collection device in a simple point to multipoint AMR system without the advanced DSP enhancement. This is similar to a simple point to multipoint AMR system using one watt transmit power and FHSS techniques in systems that started to appear in the 1990's. The area 74 represents a range up to about 1.5 kilometers that can be expected from a pole-mounted collection system that uses mesh configuration where the signal hops though several meters to reach the data collector. These system implementations began to appear in the early 2000's.

For a very narrow band system using advanced DSP techniques, an AMR system can be designed with six hop meters 71A-F suitably selected by the system controller to lie approximately on a 3 kilometer radius annulus from the tower DSP based collector 72. Each of these hop meters will have coverage illustrated by the areas 76 and 78 shown for hop meters 71A-B shown in FIG. 7, which are each approximately commensurate with the coverage area 73 of the data collection device. It should be understood that the hop meter height, whether it is mounted on a pole, building or tower, makes little difference to the overall mesh system propagation range of 1.5 Kilometers. In this configuration, seven mesh systems are covered with the enhanced tower technology as opposed to one for a conventional mesh system. The hop meters will carry all of the traffic back to the data collection device and ultimately to the WAN or backhaul link which could be GPRS or optical fiber etc. Since these use the multiple sub-channel technology to carry the traffic, there should be no capacity bottleneck. Some attention, however, needs to be paid to a tower-mounted data collection device picking up more background traffic than an equivalent pole top device to define system capacity. A preliminary analysis indicates this interference traffic is manageable. For example, many antenna options are available for the tower or building top data collection device that are impractical for a pole top device, such as those including clusters of directional antennas, and so forth.

In view of the foregoing, it will be appreciated that present invention provides significant improvements in multipoint communication systems generally and AMR systems in particular. The foregoing relates only to the exemplary embodiments of the present invention, and that numerous changes may be made therein without departing from the spirit and scope of the invention as defined by the following claims.

The invention claimed is:

1. An automatic meter reading system, comprising:
    a plurality of geographically distributed meters;
    each meter comprising a transmitter for transmitting communication signals comprising meter data via a communication protocol;
    at least one data collection device configured to receive the communication signals from the meters pursuant to the communication protocol;
    wherein the communication protocol comprises an operational frequency band divided into a plurality of main channels and application of an interference limiting hopping technique among the main channels;
    wherein each main channel is divided into a plurality of very narrow band sub-channels with frequency division multiplexing among the sub-channels;
    wherein the meters comprise hop meters and mesh meters, wherein the mesh meters communicate associated data to the hop meters, and the hop meters communicate associated data and the data received from the mesh meters to the data collection device; and
    wherein each hop meter is configured to communicate with one or more mesh meters via narrow band channels that are substantially wider than the very narrow band sub-channels used for communications between the hop meter and the data collection device.

2. The automatic meter reading system of claim 1, wherein the interference limiting hopping technique comprises frequency hopping.

3. The automatic meter reading system of claim 1, wherein the interference limiting hopping technique comprises digital code hopping.

4. The automatic meter reading system of claim 1, wherein each meter is configured to engage in bidirectional communications with the data collection device.

5. The automatic meter reading system of claim 1, wherein communications from the data collection device to the meters implement channel synchronization for the interference limiting hopping technique of the communication protocol, and communications from the meters to the data collection device deliver the meter data to the data collection device pursuant to the communication protocol.

6. The automatic meter reading system of claim 1, wherein the data collection device down-converts the communication signals from the operational frequency band to an intermediate frequency band, samples the intermediate frequency band to obtain digital representations of the communication signals, and digitally processes the digital representations of the communication signals to demodulate the communication signals and decode the frequency division multiplexing among the sub-channels.

7. The automatic meter reading system of claim 6, wherein the processing of the digital representations of the communication signals comprises application of an FFT algorithm.

8. The automatic meter reading system of claim 1, wherein each meter communicates its associated meter data directly to the data collection device.

9. A very narrow band communication system, comprising:
    a plurality of geographically distributed transmitters;
    each transmitter configured for transmitting communication signals via a communication protocol;
    at least one data collection device configured to receive the communication signals from the transmitters pursuant to the communication protocol;
    wherein the communication protocol comprises an operational frequency band divided into a plurality of main channels and application of an interference limiting hopping technique among the main channels;
    wherein each main channel is divided into a plurality of very narrow band sub-channels with frequency division multiplexing among the sub-channels;
    wherein the transmitters comprise hop transmitters and mesh transmitters, wherein the mesh transmitters communicate associated data to the hop transmitters, and the hop transmitters communicate associated data and the data received from the mesh transmitters to the data collection device; and
    wherein each hop transmitter is configured to communicate with one or more mesh transmitters via narrow band channels that are substantially wider than the very narrow band sub-channels used for communications between the hop transmitters and the data collection device.

10. The very narrow band communication system of claim 9, wherein the interference limiting hopping technique comprises frequency hopping.

11. The very narrow band communication system of claim 9, wherein the interference limiting hopping technique comprises digital code hopping.

12. The very narrow band communication system of claim 9, wherein each transmitter is configured as a transponder configured to engage in bidirectional communications with the data collection device.

13. The very narrow band communication system of claim 12, wherein communications from the data collection device to the transponders implement channel synchronization for the interference limiting hopping technique of the communication protocol, and communications from the transponders to the data collection device deliver data from the transponders to the data collection device pursuant to the communication protocol.

14. The very narrow band communication system of claim 9, wherein the data collection device down-converts the communication signals from the operational frequency band to an intermediate frequency band, samples the intermediate frequency band to obtain digital representations of the communication signals, and digitally processes the digital representations of the communication signals to demodulate the communication signals and decode the frequency division multiplexing among the sub-channels.

15. The very narrow band communication system of claim 14, wherein the processing of the digital representations of the communication signals comprises application of an FFT algorithm.

16. The very narrow band communication system of claim 9, wherein each transmitter communicates associated data directly to the data collection device.

17. The very narrowband communication system of claim 9, further configured for dynamically assigning a meter to function as hop meter and to dynamically assign one or more mesh meters to communicate with the dynamically assigned hop meter based on signal conditions affecting the dynamically assigned meters.

* * * * *